US006271020B1

(12) United States Patent
Coleman

(10) Patent No.: US 6,271,020 B1
(45) Date of Patent: Aug. 7, 2001

(54) TWO-STAGE HYBRID BIOFILTRATION

(75) Inventor: Richard N. Coleman, Vegreville (CA)

(73) Assignee: Alberta Research Council Inc. (CA)

( * ) Notice: Subject to any disclaimer, the term of this patent is extended or adjusted under 35 U.S.C. 154(b) by 0 days.

(21) Appl. No.: 09/348,867

(22) Filed: Jul. 7, 1999

(51) Int. Cl.$^7$ .............................. C12S 5/00; C12M 1/16; B01D 53/52
(52) U.S. Cl. ........................ 435/266; 435/299.1
(58) Field of Search .................. 435/266, 299.1, 435/262.5, 264; 423/224; 422/4, 120, 122

(56) References Cited

U.S. PATENT DOCUMENTS

| 5,510,265 | 4/1996 | Monticello | 435/282 |
| 5,595,910 | 1/1997 | Kant et al. | 435/289.1 |
| 5,635,394 | 6/1997 | Horn | 435/266 |
| 5,747,331 | 5/1998 | Hartikainen et al. | 435/266 |
| 5,798,044 | 8/1998 | Strohmeier et al. | 210/605 |

FOREIGN PATENT DOCUMENTS

| 198 00 686 | * | 6/1998 | (DE) . | |
| 63-134034 | * | 6/1988 | (JP) . | |
| 63277468 | | 11/1988 | (JP) | B01D/53/34 |
| 4-277010 | * | 10/1992 | (JP) . | |
| 08076670 | | 3/1996 | (JP) | B01D/53/52 |
| 08283863 | | 10/1996 | (JP) | B01D/53/38 |

OTHER PUBLICATIONS

Derwent Abstract No. 2000–254811 of Khvan Et Al, RU 2123879, Dec.–1998.*
Park Et Al. 'Treatment of Exhaust Gases from a Night Soil Treatment Plant by a Combined Deodorization . . . ' Journal of Fermentation and Bioengineering. vol. 76 (1993), No. 5, pp. 423–426.*

* cited by examiner

Primary Examiner—William H. Beisner
(74) Attorney, Agent, or Firm—Bennett Jones LLP

(57) ABSTRACT

A hybrid filter system for degrading a sulfur-containing compound having a primary stage sacrificial filter and a secondary stage biofilter is disclosed. This hybrid filter system significantly increases the lifetime of the biofilter providing a cost effective and removal effective biofiltration filter system. The process consists of two filtration stages, a primary stage sacrificial filtration and a secondary stage biofiltration. A small percentage of the sulfur-containing compound is oxidized to elemental sulfur which blocks the pore space of the filter matrix. The primary stage sacrificial filter is used to trap and remove elemental sulfur which is produced when the sulfur-containing compound is passed through the filter. To protect the secondary stage biofilter from premature plugging by precipitated elemental sulfur the primary stage sacrificial filter is used to capture the precipitated elemental sulfur. It is then sacrificed on a regular basis to minimize the impact of the elemental sulfur on the secondary stage biofilter.

26 Claims, 3 Drawing Sheets

TWO-STAGE HYBRID BIOFILTRATION

FIELD OF THE INVENTION

This invention relates to biofiltration processes and more particularly to a process and filter for increasing the biofilter efficiency in removal processes of sulfur-containing compounds.

BACKGROUND OF THE INVENTION

Environmental regulations are implemented to restrict the emission of pollutants into the atmosphere. Accordingly, it is necessary to reduce the amount of pollutants to their required level. Many chemical processes, such as fossil fuel conversion processes, release sulfur-containing compounds which must be removed from the effluent stream due to their negative environmental impact and high toxicity to most life forms. Hydrogen sulfide ($H_2S$), for example, is one of the most common sulfur-containing compound which needs removal and disposal since this acid gas is extremely toxic and very corrosive in the presence of water. Other toxic sulfur-containing compounds which need to be removed from emitted effluents before entering the atmosphere include: carbon disulfide, sulfur dioxide, carbonyl sulfide, dimethyl sulfide, dimethyl disulfide, methyl mercaptan, and ethyl mercaptan.

In recent years, environmental concerns and the introduction of new environmental laws and regulations have brought about an increasing interest in more effective and economical decontamination processes.

The majority of the biological world derives energy from the oxidation of organic compounds. However, there exist some groups of microorganisms that derive metabolic energy and reducing equivalents for their biosynthesis from the oxidation of inorganic elements and compounds. Biofiltration processes make use of these types of metabolism to remove sulfur-containing compounds from effluent gas streams.

A biofilter is usually composed of an organic material, such as compost, peat or wood bark, having microorganisms attached thereto which are capable of decontaminating an effluent gas stream. The component of interest is degraded when the gas stream passes the biofilter through the metabolizing action of the microorganisms within the filter.

A number of microbial processes for the oxidation of hydrogen sulfide have been described in the patent literature. For example, JP Patent 02126917 describes a deodorizing method. The decontamination is carried out in two peat packing layers carrying microorganisms. Similarly U.S. Pat. No. 5,747,331 discloses a process and an apparatus for the removal of sulfur-containing compounds from waste gases with the aid of microorganisms. The invention described therein is also a two-stage biodegradation process wherein in the second stage the pre-purified gas is contacted again with the microorganisms to degrade any remaining sulfur-containing compounds. The publication in VDI Berichte 735, Biologische Abgasreinigung, VDI Verlag, Düusseldorf, pp. 129–138, 1989, also discloses the use of Thiobacillus spp. microorganisms for the degradation of hydrogen sulfide in waste gases.

Even though the above mentioned processes disclose biofiltration methods for the removal of toxic waste gases, there are still problems associated with the removal strategies, such as short biofilter age or incomplete decontamination.

The design of biofilters depends upon a number of criteria; some of which are the porosity of the filter material, the surface area available for the microorganisms in the organic material to attach to, the loft of the organic material and last but not least, the cost of the media.

It is apparent, that there is a need for effective and lasting biofilters in order to make biofiltration processes more cost effective. The methods disclosed in the prior art attack the problem of biofilter effectiveness by passing the waste gas through two or more biofilters to achieve satisfactory decontamination. Another approach is the post-cleaning or chemical "polishing" of the decontaminated gas stream by passing the purified waste gas through activated carbon. However, the biofilters have to be changed quite frequently due to the deposition of solid residues and physical collapse of the biofilter material. These deposits drastically reduce the capability of the biofilter to remove waste gases since the porosity and the surface area of the biofilter are significantly reduced because of pore blockage. Another aspect of this scenario is the economical disadvantage of the methods described above as the production of biofilters is costly and time consuming.

It is an object of this invention to provide an apparatus and a method for conducting efficient biofiltration processes which are also more cost effective.

It is another object of the invention to provide a method for increasing the lifetime of biofilters.

It is an object of one embodiment of this invention to provide a method and an apparatus for the effective removal of hydrogen sulfide.

The invention disclosed herein obviates this difficulty, by providing a method and an apparatus including two filtration stages with two different filters, a primary stage sacrificial filter and a secondary stage biofilter; a hybrid biofilter system.

SUMMARY OF THE INVENTION

In accordance with the invention there is provided a system having two filters serially interconnected, only one of the two filters being a biofilter having microorganisms placed therein for removing an unwanted sulfur-containing compound contained within a gas, a method for removing the sulfur-containing compound contained within the gas comprising the ordered steps of:

(a) passing the gas through a first of the two filters, the first filter being a primary stage sacrificial filter for removing elemental sulfur that is formed when the gas passes through the first filter, said first filter being stable at a pH<7; and subsequently (b) passing the gas through the biofilter for forming a degradation product from the sulfur-containing compound, said biofilter being stable at a pH<7.

In accordance with the invention there is further provided a filter arrangement for forming a degradation product from a sulfur-containing compound contained within a gas having two sequential filters, only one of the two sequential filters being a biofilter having microorganisms placed therein, the filter arrangement comprising: (a) a first filter for removing elemental sulfur which is formed when the sulfur-containing compound passes through the first filter, said first filter being stable at a pH<7; and (b) a biofilter disposed in such a manner as to receive a remaining sulfur-containing compound from the first filter, the biofilter for degrading the remaining sulfur-containing compound to form the degradation product, said biofilter being stable at a pH<7.

Furthermore, in accordance with another embodiment of the invention there is provided a system having two sequential filters, only one of the two sequential filters being a biofilter for removing a sulfur-containing compound from a gas, a method for increasing a filter effectiveness and prolonging a lifetime of the biofilter comprising the steps of: (a) passing the gas containing the sulfur-containing compound through a first filter for removing elemental sulfur which is formed when the sulfur-containing compound passes through the first filter, the first filter being stable at a pH<7; (b) passing the gas containing a remaining sulfur-containing compound to the biofilter; and (c) passing the gas containing the remaining gaseous sulfur-containing compound through the biofilter for removing the remaining gaseous sulfur-containing compound from the gas, the biofilter being stable at pH<7.

Advantageously, the present invention provides a method and an apparatus for conducting efficient biofiltration processes which are also more cost effective. It is a further advantage of the invention to provide a method for increasing the lifetime of biofilters.

BRIEF DESCRIPTION OF THE DRAWINGS

Exemplary embodiments of the invention will now be described in accordance with the drawings in which.

DETAILED DESCRIPTION OF THE INVENTION

The method and the apparatus in accordance with the invention provides an efficient way of conducting biofiltration processes which are also more cost effective. The process in accordance with the invention includes two filtration stages: a first filtration stage including a primary stage sacrificial filter and a second filtration stage including a secondary stage biofilter.

Figure 1:
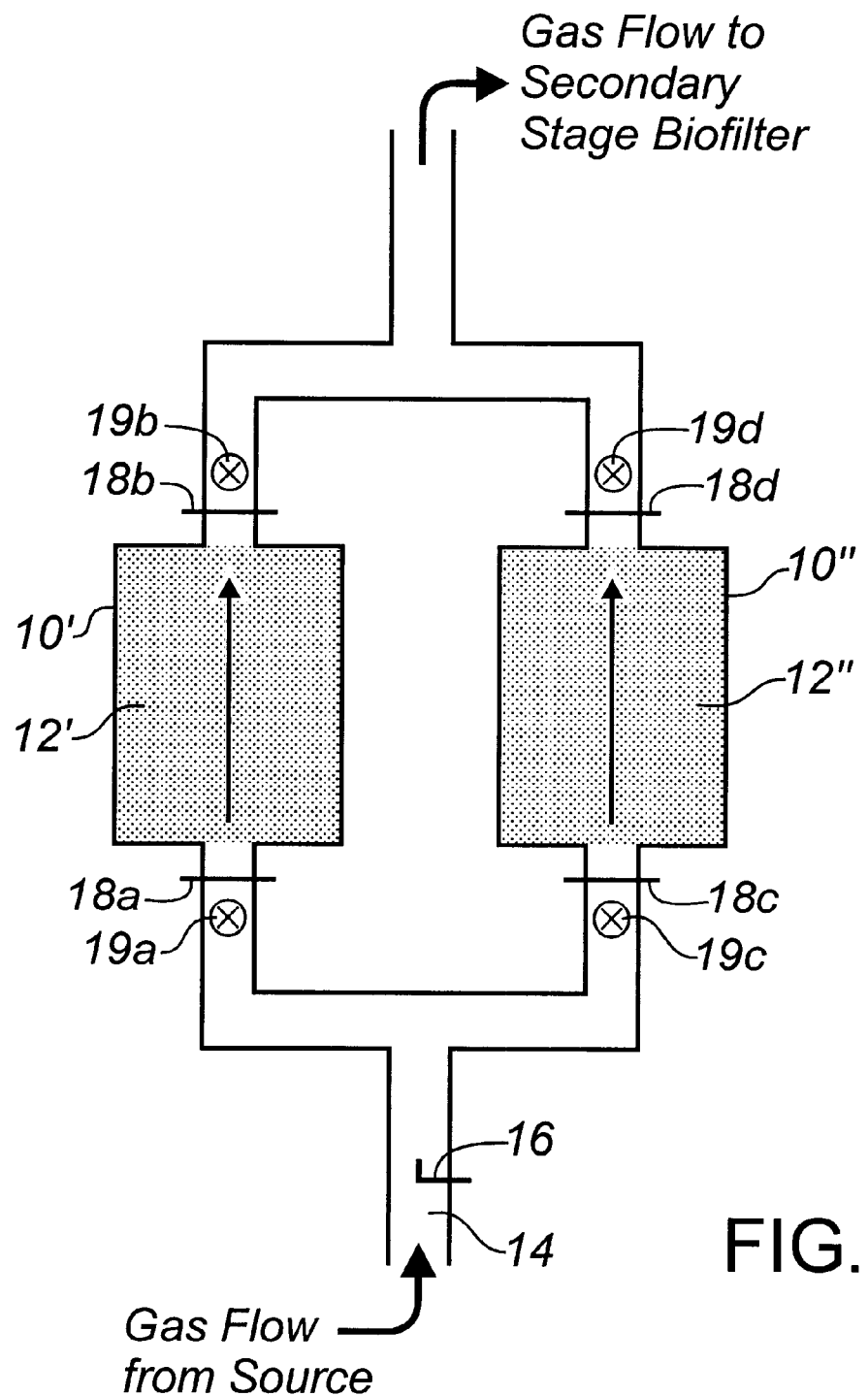
FIG. 1 shows a schematic presentation of the primary stage sacrificial filter.

Turning to FIG. 1 a schematic presentation of the primary stage sacrificial filter is shown. The primary stage sacrificial filter preferably has at least two cylindrical vessels 10' and 10" arranged in a parallel configuration. The gas containing the unwanted sulfur-containing compound is directed in an up flow manner through all vessels in a parallel configuration. The gas is either pressurized before entry or pulled through the system using a fan. The vessels 10' and 10" are typically 1 meter (3.3 ft) in height and usually 1–3 meters (3.3–9.9 ft) in diameter. The appropriate diameter is chosen depending upon the application and how much gas has to be treated.

The vessels 10' and 10" are filled with a filter matrix 12' and 12" as indicated by the gray shaded area in FIG. 1. In a preferred embodiment in accordance with the instant invention coarse sphagnum peat is used as the filter matrix. Coarse sphagnum peat for this application is peat which is retained on a plastic mesh with a square hole inner dimension of 1 cm by 1 cm (0.4 in by 0.4 in). Other dimensions may be used. The plastic mesh is made from polyethylene or polypropylene or a like material. Sphagnum peat is best suited because it has a relatively high surface area and porosity and is stable under acid conditions, i.e. the filter matrix material has to be stable at a pH<7. Alternatively other filter matrices may be used including sphagnum peat or any other type of peat, pre-molded or cut/shredded plastic media, wood chips, or inorganic materials such as crushed rock products and re-manufactured rock products, e.g. Perlite—a generic term for a naturally occurring siliceous rock, or a combination of these materials.

The direction of the gas flow is indicated by the direction of arrows presented in FIG. 1. The incoming gases are applied to the entry side 14 of the primary sacrificial stage filter in an up flow manner. After the incoming gases pass the entry side 14, they are passed through a gas moisturisation zone 16. There, the incoming gases are moisturized by fine droplets of water which are injected into the gas stream through the use of a fine spray nozzle. Alternatively, the incoming gases are moisturized by steam injected directly into the gas stream.

The primary stage sacrificial filter is used to trap and remove elemental sulfur which is produced by the chemical oxidation of hydrogen sulfide in the presence of water and oxygen. The elemental sulfur is precipitated onto the filter matrix 12' and 12", for example onto the peat, and causes premature plugging of the filter matrix and hence reduces the air flow through the filter matrix. The elemental sulfur accumulates until the pore spaces between the filter matrix, e.g. the peat strands, become occluded.

At least two vessels 10' and 10" filled with the filter matrix 12' and 12" are preferred for continuous operation so that when one filter matrix needs removal, for example when the pore spaces in the filter matrix are occluded, the incoming gases can be directed to the second vessel containing the filter matrix. The spent filter matrix is then replaced with a fresh filter matrix.

In order to remove one of the vessels 10' or 10" containing the filter matrix 12' or 12" when they become plugged while still processing the incoming gases through the respective other filter matrix 12' or 12", disconnect points 18a–18d and shutoff valves 19a–19d are disposed in the primary stage sacrificial filter. The two vessels 10' and 10" each filled with the filter matrix 12' and 12", respectively, are switched in parallel. In the case that the pores of filter matrix 12" become blocked then the shutoff valves 19c and 19d have to be closed while the shutoff valves 19a and 19b remain open. Since shutoff valves 19c and 19d are closed the incoming gases are directed through vessel 10' containing filter matrix 12'. Vessel 10" containing filter matrix 12" can be safely removed from the line at the respective disconnect points 18c and 18d and the spent filter matrix 12" can be replaced with a fresh filter matrix 12". Then vessel 10" is connected again at points 18c and 18d and the shutoff valves 19c and 19d are opened so that the incoming gas containing the unwanted sulfur-containing compound is processed again through both filter matrices 12' and 12". Analogously, vessel 10' containing filter matrix 12' is removed from the line to replace the spent filter matrix 12' with fresh filter matrix 12' if required.

After the incoming gases are passed through the primary stage sacrificial filter they are directed to the secondary stage biofilter. The purpose of the primary stage sacrificial filter is to protect the secondary stage biofilter from premature plugging by precipitated elemental sulfur which blocks the pores of the filter matrix material. In the case of hydrogen sulfide for example approximately 3% of this compound are oxidized to elemental sulfur and the remaining approximately 97% hydrogen sulfide are then removed in a following biofiltration stage through the formation of sulfuric acid as a degradation product. Elemental sulfur forms spontaneously in the presence of water, oxygen, and hydrogen sulfide. The formation of elemental sulfur would be detrimental to the performance of the biofilter. Therefore, the primary stage sacrificial filter captures the precipitated elemental sulfur. It is then sacrificed on a regular basis to minimize the impact of the elemental sulfur on the secondary stage biofilter. A replacement schedule is dependent upon the mass throughput and is determined empirically for a given situation. However, a pressure drop across the primary stage sacrificial filter is used as an indicator for establishing a replacement schedule. For example, if the pressure drop across the primary stage sacrificial filter is monitored and when a pressure of greater than 20 cm (8 in) of water column is reached, the spent filter matrix 12' or 12" is replaced with fresh filter matrix 12' or 12", respectively, in this primary stage sacrificial filter.

Figure 2:
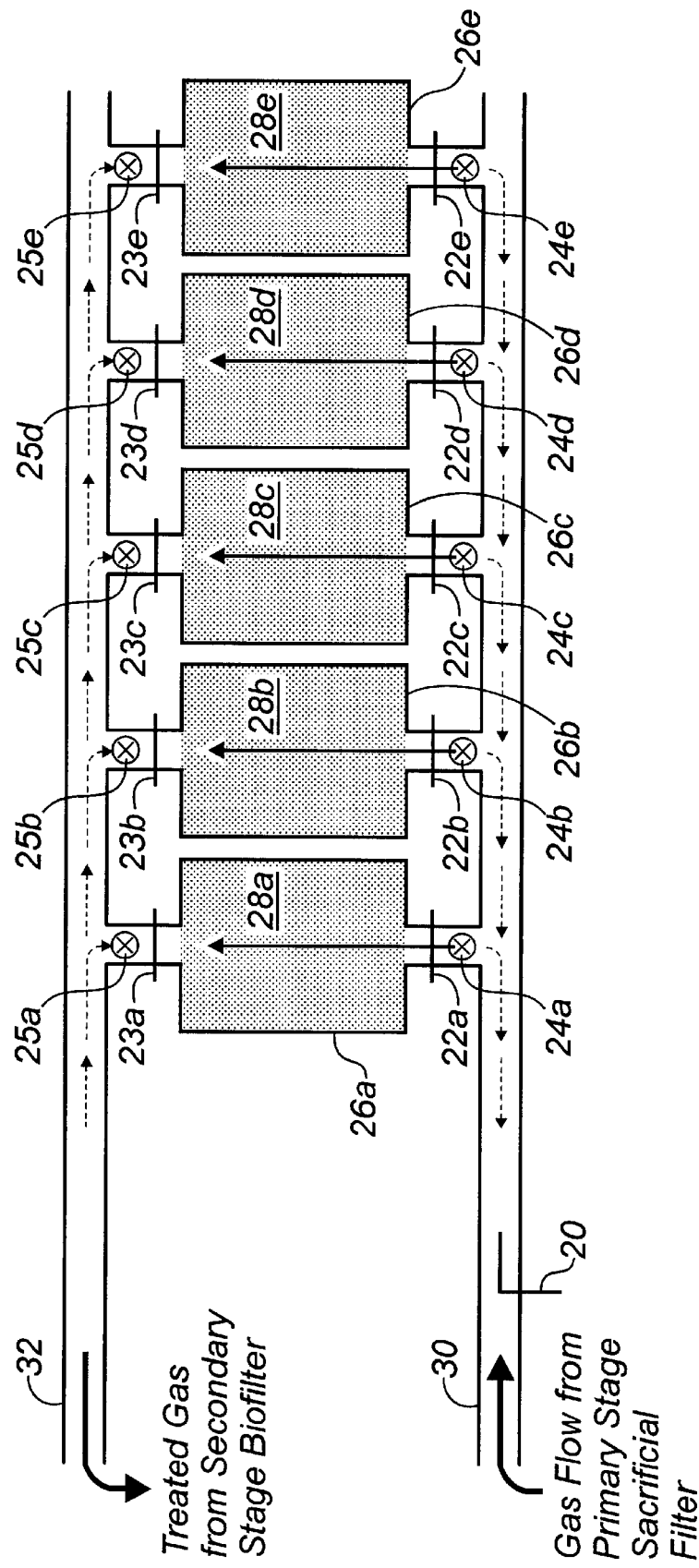
FIG. 2 shows a schematic presentation of the secondary stage biofilter.

Turning now to FIG. 2, a schematic view of the secondary stage biofilter is presented. After the sulfur-containing gas was passed through the primary stage sacrificial filter to remove elemental sulfur, it is directed to the secondary stage biofilter. The sulfur-containing gas enters the secondary stage biofilter through inlet-conduit 30 and passes through a gas moisturization zone 20. The humidification in the secondary stage biofilter is carried out by additional water spray or steam injection to the incoming gas stream and by a counter current flow of finely sprayed dilute aqueous nutrient solution applied to the top of the biofilter matrices 28a–28e.

To accommodate larger volumes of gas to be treated a plurality of vessels 26a–26e containing biofilter matrices 28a–28e, respectively, are arranged in parallel. The number of vessels is chosen in dependence upon the volume of gas to be treated. However, at least two vessels are loaded with the secondary stage biofilter for allowing the removal of at least one vessel to replace spent biofilter, and the gas to be treated is directed through the vessels containing the biofilter in an up flow manner. Again, the gas to be treated is either pressurized before entry or pulled through the system using a fan. The number of parallel vessels is increased to meet respective hydrogen sulfide loading requirements and for allowing the removal of at least one vessel to replace spent biofilter with fresh biofilter while the filtration process is maintained through the at least second vessel.

The gas containing the unwanted sulfur-containing compound enters vessel 26a–26e containing biofilter matrices 28a–28e by passing shutoff valves 24a–24e and disconnect points 22a–22e, respectively. After passing through the biofilter matrices 28a–28e the treated gas exits vessels 26a–26e by passing disconnect points 23a–23e and shutoff valves 25a–25e into the outlet conduit 32.

The biofilter environment when processing $H_2S$ is an acid environment and as a consequence the solid matrix has to be acid stable. Peat, for example, is acid stabilized since it is mined from acid bogs. The use of a solid matrix is further advantageous since it provides for two additional conditions beyond acid stability. One advantage is a large surface area which allows a maximum growth of microorganisms or biofilm. The other advantage is that the interstitial spaces are maximized to allow a free movement of the gas being treated through the filter matrix thus requiring minimal energy to move the gas. Through the microbial process various intra- and extra-cellular intermediates are formed, many of which are transient. The microorganisms oxidize hydrogen sulfide ($H_2S$) to sulfuric acid ($H_2SO_4$). The water comes from a humidified gas and a back wash of the dilute aqueous nutrient solution which is counter-current to the gas flow and further contains some essential nutrients for the microorganisms. The back wash is supplied through a spraying head providing a shallow angle spray to the top of the filter bed as illustrated in FIG. 2. The shallow angle spray is applied to spray the entire top portion of the filter bed and thus to distribute the back wash water evenly over the biofilter matrix. The water moves by gravity to the bottom of the filter where it is collected by a collection vessel (not shown). The amount of back wash water is adjusted according to the mass flow of hydrogen sulfide ($H_2S$) supplied to the biofilter in order to remove the produced sulfuric acid. The saturation level of the back wash is typically 80–85%. The produced sulfuric acid is then removed from the collection vessel at the bottom of the biofilter.

The biofilter matrices 28a–28e are one to two meters (3.3 ft to 6.6 ft) in height and have a diameter chosen in dependence upon the respective application, i.e. the volume of gas to be treated. Usually the diameter is chosen to be 1 meter or greater. However, other sizes may be used. Furthermore, the vessels containing the biofilter matrices are arranged in multiple units and the number of vessels is chosen such that the volume of gas to be treated is accommodated. Analogously to the primary stage sacrificial filter vessels 26a–26e containing biofilter matrices 28a–28e, respectively, are installed in parallel for the same reason as described above. The parallel arrangement of the vessels permits the removal of a vessel while continuing the biofiltration process of the sulfur-containing gas through the remaining vessels containing biofilter matrices. Again, shut-off valves 24a–24e and 25a–25e are provided in the line to selectively disable/enable the gas flow through at least one of the vessels for replacing the spent biofilter matrix with fresh biofilter matrix. The vessels can be removed from the line at the respective disconnect points 22a–22e and 23a–23e after the shutoff valves 24a–24e and 25a–25e are closed. Once the biofilter matrix is replaced the vessels are reconnected to the line at the respective disconnect points 22a–22e and 23a–23e and the shutoff valves 24a–24e and 25a–25e are opened again to allow the gas to flow through the fresh biofilter matrix for removing the unwanted sulfur-containing compound from the gas.

In an embodiment of the invention, the biofilter matrices 28a–28e use a matrix comprised of coarse sphagnum peat to which the microorganisms are inoculated and on which they are allowed to attach. The peat is retained on a plastic mesh. Alternatively, the matrix material is comprised of sphagnum peat or another type of peat, pre-molded or cut/shredded plastic media, wood chips, inorganic material such as crushed rock products, and re-manufactured rock products, e.g. Perlite—a generic term for a naturally occurring siliceous rock.

The following table presents a list of possible biofilter/filter matrix materials, a list of potential sulfur-containing compounds, and a list of genera of sulfur oxidizing bacteria which can be used in the hybrid biofilter system in accordance with the present invention.

TABLE I

List of Possible Bio/filter Matrix Materials, Potential Sulfur-Containing Compounds, and Genera of Sulfur Oxidizing Bacteria.

| genera of sulfur oxidizing bacteria | sulfur-containing compound | Biofilter/filter matrix material |
| --- | --- | --- |
| Beggiatoa spp. | hydrogen sulfide | peat, sphagnum or other |
| Thiothrix spp. | carbonyl sulfide | types |
| Thioploca spp. | dimethyl sulfide | plastic media, |
| Thiospirillopsis spp. | dimethyl disulfide | pre-molded |
| Achromatium spp. | methyl mercaptan | or cut/shredded |
| Thiobacterium spp. | ethyl mercaptan | wooded chips |
| Macromonas spp. | carbon disulfide | inorganic material, |

TABLE I-continued

List of Possible Bio/filter Matrix Materials, Potential Sulfur-Containing Compounds, and Genera of Sulfur Oxidizing Bacteria.

| genera of sulfur oxidizing bacteria | sulfur-containing compound | Biofilter/filter matrix material |
|---|---|---|
| Thiospira spp. | sulfur dioxide | e.g. crushed rock products, re-manufactured rock products, such as Perlite - generic term for naturally occurring siliceous rock |
| Thiovulum spp. | | |
| Bilophococcus spp. | | |
| Thiomicrospira spp. | | |
| Thiodendron spp. | | |
| Thiosphaera spp. | | |
| Paracoccus spp. | | |
| Hyphomicrobium spp. | | |
| Acidophillum spp. | | |
| Thermothrix spp. | | |
| Sulfolobus spp. | | |
| Acidianus spp. | | |
| Hydrogenobacter spp. | | |

The microorganisms attach to surfaces and since coarse sphagnum peat has a high surface area it enhances the level of microbial attachment. The total pore space of coarse spahgnum peat is approximately 92%, i.e. the pores of coarse spahgnum peat are capable of holding water at approximately 92% of the total weight of the coarse spahgnum peat and the water.

The pore size of the biofilter is variable and is determined by the selection of the size of peat particles prior to loading the biofilter. The pore size of the biofilter can also be described as the pressure drop across the biofilter, i.e. the greater the pressure drop the smaller and fewer the pores. The biofilters are loaded with peat of a certain size but they are not packed by applying physical pressure to compress or pack the matrix.

The surface of the filter matrix is not only populated with densities of microorganisms but is also well moistened with water from the humidified gas after it is passed the gas moisturization zones 16 and 20. This large and moist surface assists the diffusion of hydrogen sulfide, for example, to the attached cells/microorganisms. The microbial population attached to the filter matrix oxidizes hydrogen sulfide to sulfuric acid. The formed sulfuric acid is removed from the secondary stage biofilter by rinsing it using a counter-current flow of a dilute solution of nutrients in water illustrated by dashed arrows in FIG. 2. The essential nutrients are contained in an aqueous solution having the following components:

TABLE II

Components of the Aqueous Solution of Essential Nutrients.

| | |
|---|---|
| $KH_2PO_4$ | 3 g |
| $NH_4Cl$ | 1 g |
| $CaCl_2$ | 0.12 g |
| $MgCl_2$ | 0.21 g |
| $H_2O$ | 100 l |

Another nutrient is carbon dioxide ($CO_2$) which is present in the gas being treated. Except for the carbon dioxide ($CO_2$) these nutrients are contained in the back wash water. Thus, the aqueous solution not only facilitates the removal of sulfuric acid but also supplies nutrients and moisture to the microorganisms within the secondary stage biofilter. The secondary stage biofilter is maintained at a pH operating level in the range of 0.5 to 2.0. The pH of the effluent from the secondary stage biofilter is also in the range of 0.5 to 2.0.

The pH is controlled by the removal of produced sulfuric acid ($H_2SO_4$) throughout the application of back wash water where the pH is between 0.5 and 2.0. The temperature in this case is maintained at 30° C., however in thermophilic cases the temperature will be greater than 45° C. In the case of dimethyl sulfide and dimethyl disulfide the operating pH level is approximately 6.7. Therefore, both the primary stage sacrificial filter and the biofilter have to be acid stable at a pH<7.

Typical pressure drops across the secondary stage biofilter are in the range of 2.5 cm to 15.2 cm (1–6 inches) of water column pressure. The removal of elemental sulfur in the primary stage sacrificial filter reduces the formation of elemental sulfur and a resulting pore blockage in the secondary stage biofilter. Consequently, plugging of the biofilter matrix occurs at a much reduced rate in comparison to the primary sacrificial stage filter matrix and it requires significantly less replacement. This results in lower pressure drops for longer periods of time as compared with the primary stage sacrificial filter. Hence, in accordance with an embodiment of the instant invention the lifetime of biofilters is significantly increased. For example, when a water column pressure of approximately 15.2 cm is reached then the vessels containing biofilter units must be replaced. The replacement technique is the same as that used in the primary stage sacrificial filter as described above. However, the replacement of the biofilter units is significantly less frequent than the sacrificial filter units. The replacement schedule of the biofilter units is dependent upon the mass throughput and is determined empirically for a given situation.

The use of coarse sphagnum peat as a filter matrix material offers certain advantages which are not provided through other matrix materials. For example, coarse sphagnum peat is acid stable since peat bogs are moderately acidic and it presents a high surface area; the importance of which was discussed above. Coarse sphagnum peat has a better loft, i.e. it stays expanded and doesn't collapse during the biofiltration process.

The organic content of the peat has no bearing on the instant invention since the microorganisms used to oxidize hydrogen sulfide require no organic carbon and use carbon dioxide as their only source of carbon.

A liquid suspension of appropriate microorganisms is applied to the upper surface of the biofilter and "washed in" using distilled water.

If needed, the gas to be treated is humidified by the addition of water in a fine spray nozzle or injected steam to the gas before entering the primary stage sacrificial filter and the secondary stage biofilter. Most of the humidification occurs within the primary stage sacrificial filter and in the secondary stage biofilter by the counter current flow of the dilute aqueous nutrient solution or by additional water spray or steam injection to the incoming gas stream.

In accordance with an embodiment of the invention a method and an apparatus are provided for the effective removal of hydrogen sulfide. The hybrid filter system, a primary stage sacrificial filter and a secondary stage biofilter, is capable of managing a hydrogen sulfide loading rate in the range of 400 to 500 g hydrogen sulfide per $m^3$ per hour. The hydrogen sulfide removal rate/effectiveness is very similar to the hydrogen sulfide loading rate. The residence or retention time of the gas to be treated in the secondary stage biofilter of the described example is 15 seconds for the one meter high vessel and accordingly greater for vessels of larger height.

Figure 3:
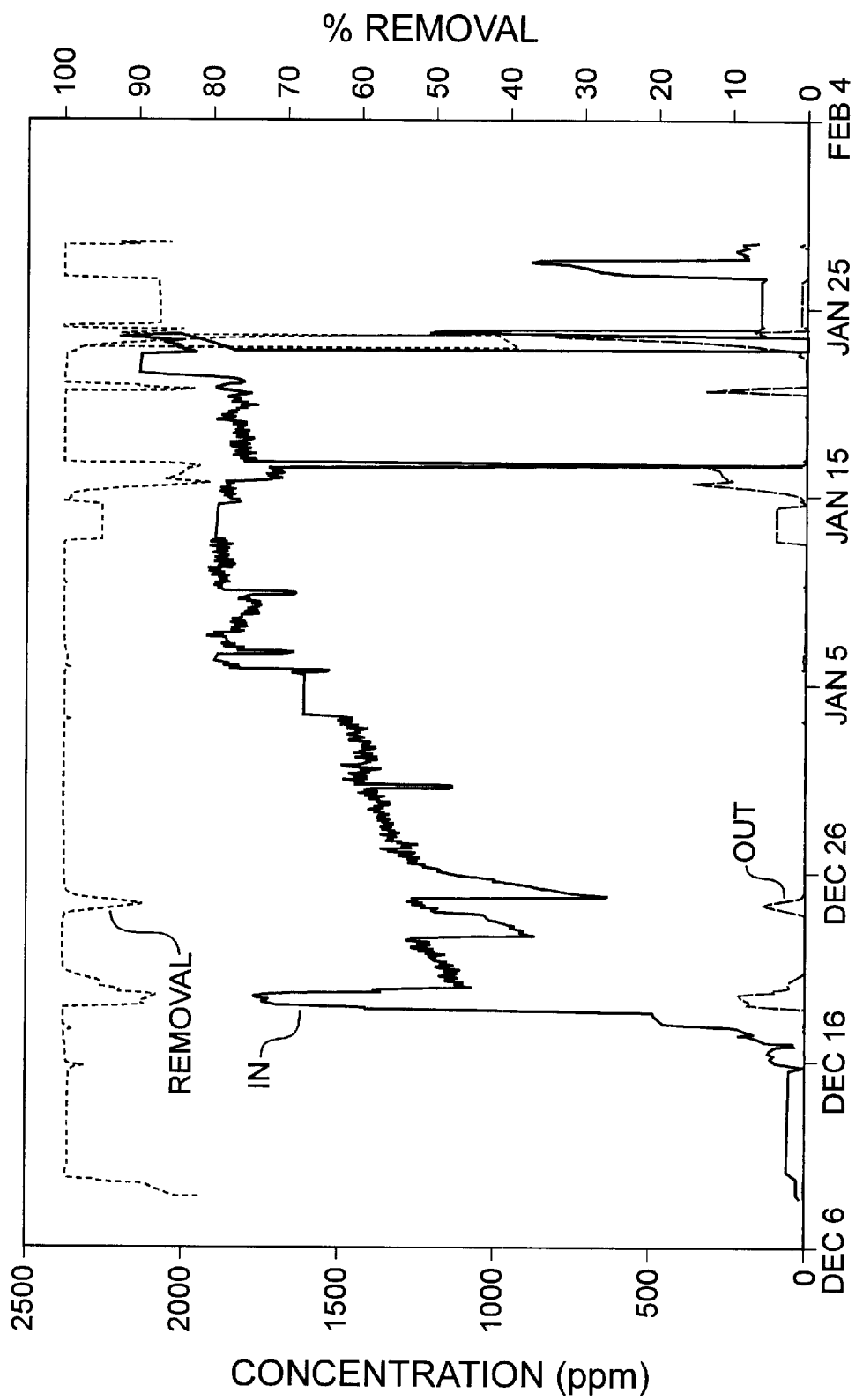
FIG. 3 presents a graph showing performance data of the secondary stage biofilter.

The performance data of the hybrid filter system in accordance with the invention are presented in FIG. 3. These data describe the performance for the secondary stage biofilter. The hydrogen sulfide concentration entering the biofilter was determined at or near 1,900 parts per million on a volume basis as shown in FIG. 3. Furthermore, FIG. 3 demonstrates clearly that the specific removal of hydrogen sulfide was in excess of 99%. The removal effectiveness of hydrogen sulfide as presented in FIG. 3 is 500 g hydrogen sulfide per $m^3$ of secondary stage biofilter matrix per hour.

Depending on the hydrogen sulfide loading the primary stage sacrificial filter remains functional for up to 8 weeks and the secondary stage biofilter remains functional for up to two years. Clearly, the hybrid filter system of primary stage sacrificial filter and secondary stage biofilter significantly increases the lifetime of the biofilter providing a cost effective and removal effective biofiltration filter system. Prior art two stage biofilter systems would experience a similar rate of pore blockage in the initial biofilter at a significantly higher cost reflecting the higher time and cost in preparing biofilters.

In accordance with another embodiment of the invention the hybrid filter system of primary stage sacrificial filter and secondary stage biofilter is used for the degradation of a liquid sulfur containing compound. In the case that a liquid sulfur containing compound is delivered to the hybrid filter system for the degradation of the liquid sulfur containing compound, it is suspended in a carrier gas as an aerosol and delivered to the hybrid filter system in the same manner as described for the gaseous sulfur containing compound. Such liquid sulfur containing compounds are dimethyl sulphide, dimethyl disulphide, methyl mercaptan (gas or liquid-boiling point 7.6° C.), ethyl mercaptan and carbon disulphide as listed in Table I.

The above-described embodiments of the invention are intended to be examples of the present invention and numerous modifications, variations, and adaptations may be made to the particular embodiments of the invention without departing from the scope and spirit of the invention, which is defined in the claims.

What is claimed is:

1. A two-stage hybrid biofiltration apparatus for removing a sulfur-containing compound from a gas stream comprising:
   (a) a primary stage abiotic filter for entrapping elemental sulfur produced from the oxidization of hydrogen sulfide, said primary stage filter having an inlet and an outlet;
   (b) a secondary stage biofilter connected in series with the primary stage filter, said biofilter having an inlet connected by gas transfer means to the primary stage filter outlet and air outlet, and said biofilter being stable at pH levels less than about 7.

2. The apparatus of claim 1 wherein the primary stage filter comprises at least two vessels situated in parallel with each other.

3. The apparatus of claim 2 wherein said inlet further comprises a shut-off valve for each individual vessel of said primary stage filter for isolating said vessels from the gas flow.

4. The apparatus of claim 2 wherein the vessels of the primary stage filter include;
   (a) a first and second end;
   (b) an opening at said first end to permit gas entry from said inlet;
   (c) a solid matrix contained within said vessel for removing sulfur from the gas;
   (d) an opening at said second end to permit gas flow into said gas transfer means; and
   (e) disconnect points at said first and second ends for the detachment and removal of the said vessels from said apparatus.

5. The apparatus of claim 4 wherein said solid matrix is comprised of a solid material from the following group consisting of:
   (a) peat;
   (b) plastic media;
   (c) wood chips; and
   (d) crushed rock products.

6. The apparatus of claim 5 wherein said solid matrix is comprised of coarse sphagnum peat.

7. The apparatus of claim 4 further comprising a sensor for monitoring the gas pressure differential of the untreated gas passing through said primary stage filter for determining the available pore size in said primary stage filter.

8. The apparatus of claim 1 wherein the secondary stage biofilter being comprised of at least two vessels situated in parallel with each other.

9. The apparatus of claim 8 wherein said gas transfer means further comprises a shut-off valve for each individual vessel of said primary stage filter and secondary stage biofilter for isolating said vessels from the gas flow.

10. The apparatus of claim 1 further comprising a gas moisturisation zone contained in said inlet for moisturizing the gas prior to its entry into said primary stage filter.

11. The apparatus of claim 1 further comprising a gas moisturisation zone contained in said gas transfer means for moisturizing the gas prior to its entry into said secondary stage biofilter.

12. The apparatus of claim 1 wherein the vessels of said secondary stage filter include:
   (a) a first and second end;
   (b) an opening at said first end to permit gas entry from said gas transfer means;
   (c) a solid matrix and microorganisms contained within said vessel for removing sulfur from the gas;
   (d) an opening at said second end to permit gas flow into said outlet; and
   (e) disconnect points at said first and second ends for the detachment and removal of the said vessels from the apparatus.

13. The apparatus of claim 12, wherein said solid matrix is comprised of a solid material that provides a suitable and stable medium for said microorganisms at pH levels below about 7.

14. The apparatus of claim 12, wherein said solid matrix is comprised of a material from the following group:
   (a) peat;
   (b) plastic media;
   (c) wood chips; and
   (d) crushed rock products.

15. The apparatus of claim 14 wherein said solid matrix is comprised of coarse sphagnum peat.

16. The apparatus of claim 12 further comprising a sensor for monitoring the gas pressure differential of the untreated gas passing through said secondary stage biofilter for determining the available pore size in said secondary stage biofilter.

17. The apparatus of claim 12 wherein said microorganisms are selected from the group consisting of:
   (a) Beggiatoa spp.

(b) Thiothrix spp.
(c) Thioploca spp.
(d) Thiospirillopsis spp.
(e) Achromatium spp.
(f) Thiobacterium spp.
(g) Macromonas spp.
(h) Thiospira spp.
(i) Thiovulum spp.
(j) Bilophococcus spp.
(k) Thiomicrospira spp.
(l) Thiodendron spp.
(m) Thiosphaera spp.
(n) Paracoccus spp.
(o) Hyphomicrobium spp.
(p) Acidophillum spp.
(q) Thermothrix spp.
(r) Sulfolobus spp.
(s) Acidianus spp.
(t) Hydrogenobacter spp.

18. The apparatus of claim 17 wherein the microorganism comprises Thiobacillus thiooxidans.

19. The apparatus of claim 18 further comprising at least one spray head for spraying a nutrient solution over the top of the solid matirx in said vessels comprising said secondary stage biofilter.

20. The apparatus of claim 12 wherein gas flows through the secondary stage biofilter from bottom to top.

21. The apparatus of claim 12 further comprising a collection vessel for collecting liquid from the bottom of the secondary stage biofilter vessels.

22. A method for removing a sulfur-containing compound contained within a gas comprising the steps of:
(a) providing a primary filter wherein said primary filter is a sacrificial filter for removing elemental sulfur that is formed when the gas passes through the primary filter;
(b) providing a secondary filter wherein said secondary filter is a biofilter comprising microorganisms which degrade the sulfur-containing compound; and
(c) passing the gas through the primary filter and subsequently the second filter.

23. The method of claim 22 comprising the further step of moisturizing the gas prior to passing it through said primary and secondary filters.

24. The method of claim 22 comprising the further step of trickling a nutrient solution through the secondary filter, countercurrent to gas flow within the filter.

25. The method of claim 22 comprising the further step of monitoring the pressure differential of the gas upon passing said primary stage filter, said pressure differential being used as an indicator for determining a level of pore blockage in said primary stage filter.

26. The method of claim 22 comprising the further step of isolating, removing and replacing individual vessels when the filter pores become occluded, whilst maintaining uninterrupted gas flow through the remaining vessels.

* * * * *